INVENTOR
MARK SCHUMAN

United States Patent Office

3,516,745
Patented June 23, 1970

3,516,745
APPARATUS FOR GAS ANALYSIS USING A CLOSED CYLINDER CONTAINING A FREE FLOATING PISTON
Mark Schuman, Ann Arbor, Mich.
(101 G St. SW., Apt. 516, Washington, D.C. 20024)
Filed Sept. 4, 1968, Ser. No. 757,271
Int. Cl. G01j 3/30
U.S. Cl. 356—85                                7 Claims

ABSTRACT OF THE DISCLOSURE

Producing gas spectral emissions by regularly and cyclically compressing the gas and detecting the spectral emission therefrom at the compression frequency and phase, using a highly reflective, closed cylinder containing a free floating regularly oscillating piston. A window in the cylinder wall, near each end of the cylinder, permits continuous optical observation of the gas spectral emissions. Means are provided for quantitative measurement of the induced radiant emissions and therefore gas concentrations.

BACKGROUND OF INVENTION

Spectral analysis of gases, to determine the identity of the chemical ingredients thereof, is customarily accomplished by measuring the spectral absorption of radiation by gases present in a beam of radiant emission from a heated source.

Gases detectable normally would be those having strong absorption, and therefore strong emission, bands, such as carbon monoxide, sulphur dioxide, ozone. However, if high pressures are used, substances normally non-emitting may emit weakly and be detectable in high concentrations. Also, pyrolysis can change the chemical structure and thereby produce emitting, and therefore, detectable substances.

Spectral absorption therefrom is read and recorded using suitable detectors and electronic amplification and recording equipment. However, the typical analysis methods followed produced unwanted signals as a result of slight changes or drifts, in characteristics of system components. This resulted in poor and inaccurate readings, particularly where only slight amounts of the chemical ingredients analyzed are contained within the gas. Hence, although the conventional methods are adequate for many purposes, they are limited in accuracy by this drift, particularly where only small traces of the ingredients to be detected are contained within the volume of gas tested. Thus, they are limited in ultimate sensitvity by sources of drift. Also, because a long optical path legend is desired for increasing the sensitivity for a given amount of drift, they are relatively bulky and heavy for a given degree of sensitivity.

Attempts have been made in the past to produce more accurate measurements of spectral signatures and to reduce the unwanted drift signals, but none have been completely adequate for highly accurate trace identifications and measurements by a compact, light-weight unit.

SUMMARY OF INVENTION

It is an object of this invention to utilize heat to drive a piston in order to produce and detect spectral emissions of gaseous mediums by means of approximately adiabatic compression and expansion of the gaseous medium in a regular, cyclical pattern and to detect the resulting periodic spectral emissions, which occur at approximately the same frequency and phase as the temperature and pressure variation. The detection is accomplished by means of a radiant detector, electronic amplification, spectral comparison networks, and synchronous rectification of the sinusoidal output of the comparison networks, in order to obtain a D.C. signal which is proportional to gas concentration.

A further object is to utilize the heat additionally for inducing chemical changes in gases for better detection and identification.

An additional object is to utilize the heating and pressurizing equipment to produce a non-spectral signal which lags the gas emission signal by a phase angle of 90° and is useful for essentially eliminating output voltage drift.

Summarizing, the method herein contemplates cyclically and regularly, approximately adiabatically, compressing and expanding a gas within two windowed chambers formed within a cylinder, one chamber containing gas which has been heated to induce chemical changes, and reading and recording the periodic spectral emission to thereby determine the components of the gas mixture by means of their characteristic spectral emissions.

Briefly, the apparatus contemplated comprises a closed cylinder containing a free floating, rapidly oscillating piston which divides the cylinder into two variable volume, compression chambers. Gas trapped within and compressed by the piston movement into either chamber tends to rebound and drive the piston in the opposite direction towards the opposite chamber and vice-versa. Thus, the oscillation of the piston is maintained by the rebound or springiness of the compressed gas at each end of the cylinder as well as by the addition of heated gas from a continuously operated heater. The heated gas supplied to the compression chamber provides the additional energy needed to overcome the normal tendency of the piston to slow down and ultimately stop. A window in each compression chamber portion of the cylinder provides an exit for some portion of the spectral emission by the compressed and heated gases, so that the emission can be passed through suitable filters and focused upon detectors which produce electronic signals which may be processed and compared to indicate gas concentration.

These and other objects and advantages of this invention will become apparent upon reading the following description, of which the attached drawings form a part.

DETAILED DESCRIPTION

Figure 1:
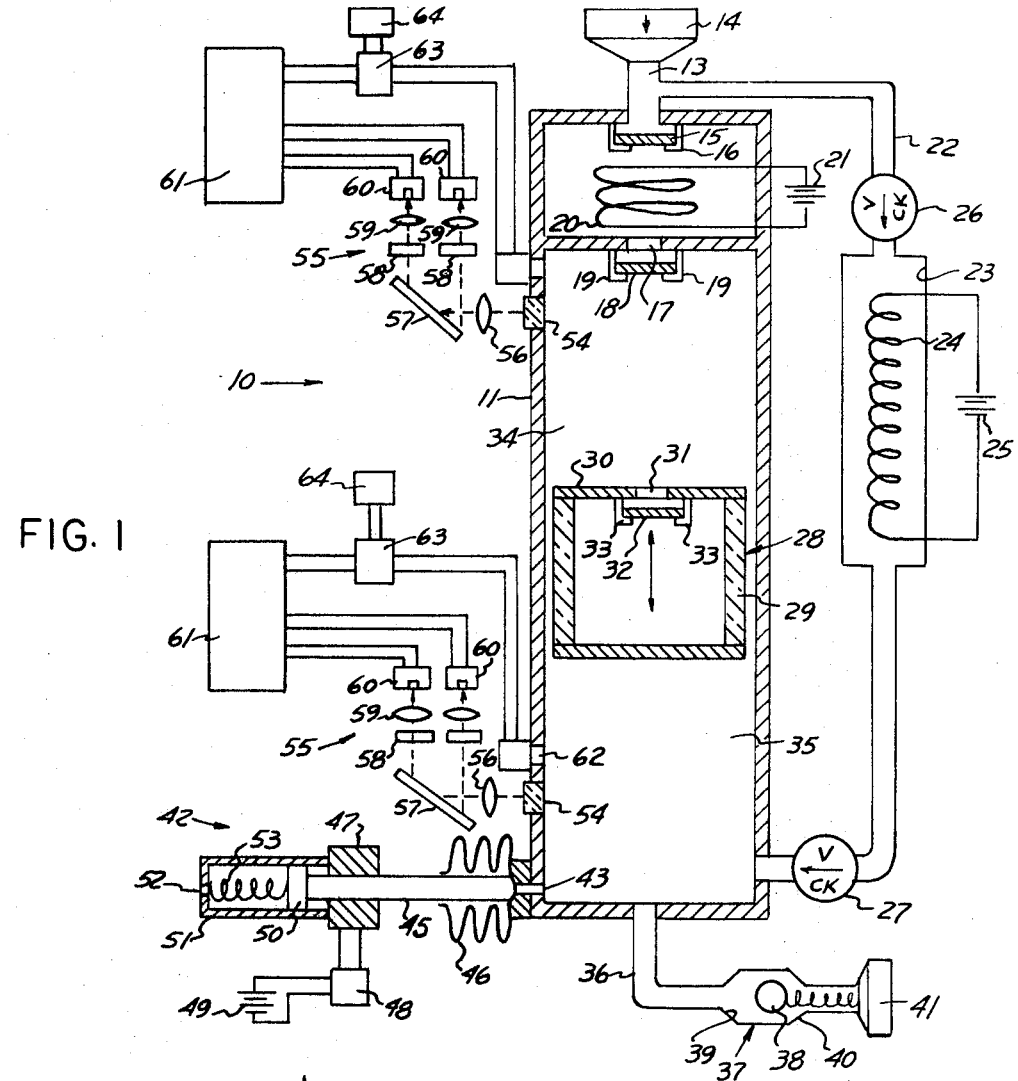
FIG. 1 is a schematic, elevational view of the apparatus herein.

FIG. 1 schematically illustrates the apparatus 10 which includes a cylinder 11 whose interior wall surface is made highly reflective. The upper end of the cylinder is divided off into a heating compartment 12 into which a gas inlet pipe 13 connects. The inlet pipe is secured to an inlet filter 14 which may be opened to atmosphere where the detector device is used for spectral analysis of atmospheric gases or it may be connected to some further apparatus to receive gases to be analyzed.

The inlet pipe 13 is closed off by a one-way inlet valve 15, illustrated schematically as a movable wafer mounted within stops 16 which limits its opening movement.

The opening 17 between heating compartment 12 and the cylinder body is closable by means of a suitable one-way outlet valve 18, also illustrated as a movable wafer mounted within limiting stops 19. A wide variety of check valves or one-way valves may be utilized for the required valves 15 and 18, with the exception that valve 18 preferably closes shortly after, rather than simultaneously with, valve 15, so that it functions as a delayed action valve. For certain uses, valve 18 may be eliminated, thereby simplifying the construction.

The heating compartment contains a continuously operated heater element 20 such as an electrical heater coil connected to a conventional source 21 of electrical energy, as illustrated schematically.

A shunt pipe 22 interconnects the inlet pipe 13 with the lower end of the cylinder. This pipe includes a second heating compartment 23 containing an electrical heater element 24 connected to an electrical power source 25. One-way heater inlet check valve 26 and heater outlet check valve 27 control gas movement through the shunt pipe 22. As in the case of valve 18, outlet check valve 27 is preferably a delayed action valve, in that its closing lags the closing of the inlet check valve 26.

Heating compartment 23 is considerably hotter and/or larger than compartment 12 for thermally inducing chemical changes in the gases and for better efficiency of operation. Although an electrical coil heater element is illustrated, other conventional types of continuously operated heating elements may be used, such as a gas burner or the like.

Arranged within the cylinder 11 is a free floating, hollow piston 28 which is adapted to oscillate coaxially with the axis of the cylinder. Preferably, this piston is formed of a porous gas pervious outer wall 29, such as porous sintered metal. The piston cover 30 is provided with a central aperture 31 closed by a one-way wafer valve 32 mounted within opening limiting stops 33. Both The piston 28, in effect, divides the cylinder into two separate variable volume optical chambers, that is, an upper chamber 34 and a lower chamber 35.

Connected to the lower end of the cylinder is an intake-outlet pipe 36 having a two-way double sealing, spring loaded check valve 37, which opens momentarily twice each cycle to exhaust gas from the cylinder, and then closes. For example, this valve may include a movable sealing ball 38 which alternatively seals against one or the other of opposed seals 39 and 40, with sufficient space between the seals to permit gas movement while the ball moves from one seal to the other. Pipe 36 terminates in a filter 41 which is either opened to atmosphere where atmospheric gases are being measured, or to some suitable region for exhaust.

The operation of the piston is as follows: The piston rapidly oscillates or moves rapidly upwardly or downwardly within the cylinder as for example, at approximately 10–100 cycles per second. On its downstroke, it compresses the gas contained within the lower chamber portion 35 until the gas is compressed to its maximum point, at which time the gas will rebound or expand, driving the piston upwardly. On its way up, the gas contained in the upper chamber portion 34 is compressed by the piston so that when it too reaches its maximum compression, it rebounds or expands and drives the piston downwardly, with the cycle being regularly and constantly repeated.

Meanwhile, on each upward stroke, the one-way valve 32 in the piston cover 30 opens and gas enters the piston, leaking out continuously through the gas pervious wall 29 to gas lubricate the piston. A similar opening and one-way valve may be located in the bottom of the piston for the same purpose if desired.

As described above, the piston, in effect, is suspended between two springs which compress and then rebound to drive the piston up and down.

If no more were done, the piston would gradually slow down and then stop. Therefore, to provide the additional energy or push needed to continue the oscillation of the piston between the two spring-like gas volumes, heated gas from the second heating compartment 23 enters the lower chamber portion 35 through the open valve 27 on the upward movement of the piston. Such gas expands within the lower chamber to provide the additional needed energy to maintain the oscillation of the piston. Prior to the top of the stroke, gas exhausts through the valve 37 as the dropping pressure in the lower chamber allows its sealing ball 38 to move from the right side seal 40 to the left side seal 39. Because gas has just been exhausted, a fresh supply of cool gas will be drawn into the heating chamber 23 by the upward movement of the piston, until it stops at the top of its stroke.

On the downward stroke of the piston, some of the gas returns back through the valve 27 to the heating compartment until the pressure builds up to the point where the one-way valve 26 closes. Then the one-way valve 27 closes and pressure begins to build up in the heating chamber 23 for driving the piston upwards later on the upstroke.

In order to maintain the center of oscillation of the piston midway between the ends of the cylinder, gas may enter the lower chamber 35 through the intake valve 27 when the piston is up, just as gas may enter the upper chamber 34 through the valve 17 when the piston is down.

The heating compartment 12 with its valves 15 and 18 operate in the same manner as do heating compartment 23 and its valves 26 and 27. However, it has little tendency to induce thermal changes in the gas, because it is either made small so that only a small fraction of the gas drawn through it is actually heated, or it is operated at moderate temperature, that is, a temperature much lower than the temperature of heating compartment 23. The upper optical chamber 34 then monitors mainly unpyrolyzed gas. Since the gas flow from the heating chamber 23 is several times greater than the gas flow from the upper cylinder portion 34 to the lower cylinder portion 35, the lower optical chamber therefore monitors mainly heat treated or pyrolyzed gas.

The net result of the piston movement is an approximately adiabatic compression and expansion cycle within the chambers 34 and 35 which excites or energizes the gas contained therein to give off spectral emissions.

The foregoing asumes the piston to be regularly oscillating. However, in order to start up or begin the oscillation, since the piston is not accessible to mechanical connection, a suitable starter mechanism 42 is provided. This mechanism pumps gas into and sucks gas out of the lower chamber portion 35 to move the piston upwardly and downwardly until such time as the system stabilizes, after which the starter mechanism may be shut off.

The starter may vary in construction, but one example is illustrated in FIG. 1. This comprises an opening 43 into the lower chamber portion 35, surrounded by a ring-seat 44 against which the end of a rod 45 is abutted. Connected to the rod 45 is one end of a bellows 46 whose opposite end is connected to the ring 44 so that back and forth movement of the rod moves the bellows to pump gas into and suck gas out of the chamber portion 35. This moves the piston up and down.

The rod is surrounded by a conventional solenoid coil or linear actuator 47 connected through a timer 48 to an electrical source 49 and which operates to retract or move the rod 45 to the left (as shown in FIG. 1) for opening the bellows and sucking gas into it. The rod terminates in a piston 50 fitted within a cylinder 51 having an air escape hole 52 and containing a conventional compression spring 53 which returns the rod towards the right into the position shown in FIG. 1. With the cooperation of the timer 48, the rod movement is timed to the frequency of oscillation of the piston to thereby start the piston oscillating at a preselected frequency. The starter is used as long as necessary until the piston stabilizes, at which point it may be turned off.

In order to detect and read the spectral emissions of the gas within the respective cylinder chambers 34 and 35, each is provided with a transmitting window 54 through which the emissions may be continuously observed by a conventional optical observation system 55. FIG. 1 schematically illustrates such an optical system comprising a viewing lens 56, reflector 57, above which are a pair of filters 58 and lenses 59 and a pair of detectors 60 which convert the optical signals into electronic signals. The signals are then transmitted to conventional, electronic-type spectral analysis equipment 61 which reads and records the spectral emissions. Conventionally, the signals from the detectors would be compared, amplified, and then synchronously rectified. The phase of the synchronous switching is determined by a phase sensing device, such as a pressure transducer 62, extending into the cylinder, which operates a switching relay 63. Thus, a D.C. signal, smoothed by means of a filter such as a conventional R.C. filter, is obtained by rectifying the alternating emission signal. The magnitude of the D.C. signal is proportional to gas concentration in the medium drawn into the device.

Synchronous rectification is phase sensitive. A radiant signal lagging the gas emission signal by a quarter of a cycle, i.e., a phase angle of minus 90°, has no effect on the gas detection signals. Such a radiant signal can be useful for reducing drifts in the gas detection output voltage, and is available from the heating compartments.

The method is to generate this lagging signal either by exposing the heating compartment by the opening of its one-way valve, such as valve 17, or by heating the optical chamber walls by the hot gases escaping from the heating compartments, so that the heated wall surface emits non-spectral radiation, as would a metallic surface, and then a second synchronous switch 64 is added in parallel with the regular one (connected to the same terminals), with the second switch lagging in its switching also by a quarter of a cycle or 90°. Thus two D.C. outputs are now obtained. Since the second output represents the detection of a nonspectral signal, it should always be at zero volts. If the system has drifted from the original balance condition, due to such factors as changing transmission of filters, it will not be at zero volts. However, if this second output voltage is fed back to the comparison network, using conventional feedback techniques to modify the comparison in a direction which reduces this output voltage, a nulling type system results which continuously modifies the comparison network so as to maintain the second output at zero volts. Thus, the comparison network is continuously balanced to provide a zero voltage output for a non-spectral input. Since the sources of drift are independent of phase angle, the gas detection voltage is then also continuously rebalanced so as to be effectively drift free. Since the gas detection signal is unaffected by the lagging radiant signal from the heating chamber or heated walls, it can continuously provide gas concentration information while being balanced and in the presence of this lagging radiant signal in the optical chambers. Conversely, the balancing process at the lagging phase is not affected by the presence of spectral emission by gases because of this same independence of radiant signals 90° away in phase.

By proper design of the heating chambers and by proper selection of emissivity, thermal conductivity, specific heat and the like for the materials exposed to hot gas, either within the heating compartment or on the optical chamber walls, the phase and magnitude of the lagging signal can be chosen. The magnitude is not critical because it is a nulling process. The phase accuracy is not critical because all that is required for drift improvement is that the minus 90° component of the non-spectral signal be several times bigger than the 0° component, i.e. the component at the gas emission phase.

If the optical chamber itself, by virtue of its changing wall area, produces a non-spectral radiant emission, this must be added vectorially to that produced by the heating compartment and the heating effect of its gases, so that the vector sum, or net non-spectral radiant emission signal from the optical chamber is close to minus 90° in phase, i.e., lags the gas emission phase by about 90°.

Thus, the magnitude of the output drift produced by a given shift in the balance between optical channels is proportional to the signal emitted from the cylinder itself, due to the cyclical variation of wall area, temperature and emissivity. In the foregoing equipment, the exposure of the chambers 34 and 35 periodically to the heating compartments 12 and 23 results in a counter or nullifying signal which tends to cancel out to a substantial degree the 0° signal component emitted from the cylinder wall, thereby substantially reducing this proportionality factor of the output drift, so that the non-spectral signal at minus 90°, as mentioned above, is several times larger than the magnitude of the residual, or uncancelled, non-spectral signal at 0°.

MODIFICATION—FIG. 2

Figure 2:
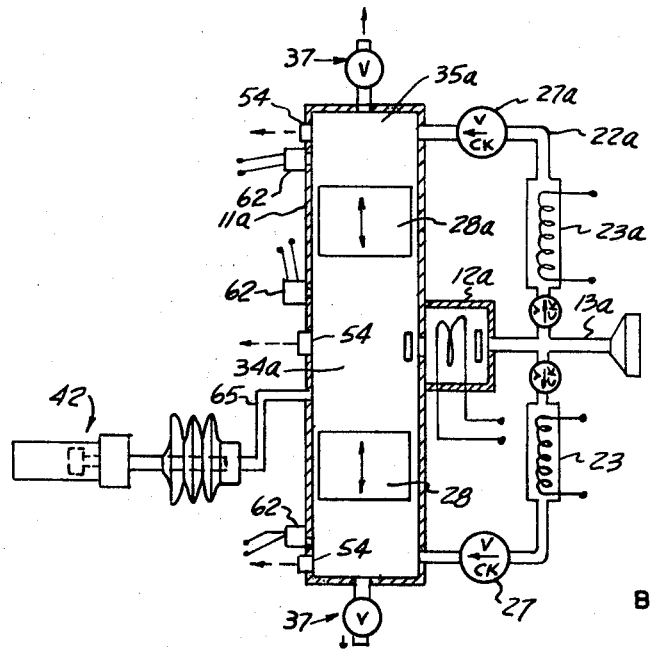
FIG. 2 is a schematic, elevational view of a modification.

Although the equipment described above is relatively quiet and vibration free, its slight vibration can be reduced even further by the use of a dual piston arrangement. Thus, FIG. 2 illustrates apparatus which is substantially identical to that described above with the exception that the cylinder 11a has been upwardly elongated and is provided with a second piston 28a to provide a third chamber 35a, similar to chamber 35. The heating compartment 12a has been arranged on the side of the cylinder, opening into the central, common chamber portion 34a. Here, the starter 42 is connected through a starter pipe 65 to the central chamber portion 34a, otherwise operating as described above.

In addition, a shunt pipe 22a connects the inlet pipe 13a to the third chamber through heating compartment 23a and a check valve 27a.

In this modification, the pistons operate synchronously, but oppositely to each other, so that they move together and then move apart simultaneously, following the same cyclical pattern, with the operation being identical to that described in connection with FIG. 1. Here, three observation windows and optical systems may be utilized or only two may be used as in FIG. 1.

This invention may be further developed within the scope of the following claims. Accordingly, it is desired that the foregoing description be read as being merely illustrative of an operative embodiment of this invention, and not in a strictly limited sense.

Having fully described at least one operative embodiment of this invention, I now claim:

1. An apparatus for producing characteristic spectral emissions by substances present in a gaseous medium for detection thereof, comprising:
   a cylinder containing a piston movable coaxially of the cylinder and dividing the cylinder into two variable volume optical cavities at the opposite ends of the piston;
   means for regularly and cyclically oscillating said piston within the cylinder for successively compressing gas contained within the cavities in an approximately adiabatic compression and temperature increase in accordance with the direction of movement of the piston, for producing a periodic spectral emission from said substances;
   optical means for detecting the spectral emission produced within one of the two cavities, and producing an electrical signal in response to said spectral emission;
   and an electrical system for receiving and reporting said spectral emission caused electrical signal.

2. An apparatus as defined in claim 1, and including each cavity having a continuously operated gas heating compartment connected by an inlet to its respective cavity for heating gas;
   valve means arranged within said inlets and openable for optically exposing each cavity ot its respective compartment and for adding heated gas from each compartment to its respective cavity during movement of the piston towards the opposite cavity for thereby tending to nullify emission signals caused by the wall of the cylinder itself and to produce a non-spectral radiant emission signal lagging the gas emission signal by a phase angle of 90° tending to reduce the effect of non-spectral emissions on the output of said system.

3. An apparatus as defined in claim 2, including a second optical means and electrical system, identical to the first mentioned optical means and electrical system for observing and detecting the spectral emission produced within the second of the two cavities;

with one of said heating compartments being considerably hotter than the other for pyrolyzing gas passed through it, wherein the spectral emission produced and detected in said one of said cavities is of a pyrolyzed gas, with that of the other cavity being of an unpyrolyzed gas.

4. An apparatus as defined in claim 2, and said compartments each being opened to a gas medium source through a one-way valve formed to close during movement of the piston towards its respective chamber and for opening to allow the gas to enter the compartment when the piston moves towards the opposite chamber for detecting substances in said gas and one of said chambers having an exhaust closed by a valve formed to open for a short time as compression of gas within it begins, and to open for a short time again just before compression has ended, to exhaust a fraction of the compressed gas before closing.

5. An apparatus for producing characteristic spectral emissions by substances present in a gaseous medium thereof, comprising:

a cylinder containing a free floating piston dividing the cylinder into a pair of variable volume chambers separated by the piston;

said piston regularly oscillating within the cylinder for cyclically compressing gas contained within each chamber, wherein the rebound of gas compressed by the piston within one chamber portion drives the piston towards the opposite chamber and vice-versa;

a gas heating compartment containing a continuously operated heater and connected to one of the chambers for supplying heated gas to said one chamber during movement of the piston towards the opposite chamber for additionally driving the piston;

a window formed in the cylinder wall and optical means for continuously observing through the window spectral emissions of the gas compressed within a chamber;

means for detecting the optically observed spectral emission signals.

6. An apparatus as defined in claim 5, and including a second, free floating piston identical to the first mentioned piston contained within the cylinder to form a third chamber and with the cylinder portion between the two pistons forming a chamber being common to both pistons;

with said pistons synchronously oscillating towards and away from each other for thereby reducing vibration of the apparatus.

7. An apparatus as defined in claim 4, and including a starter means for regularly blowing gas into and sucking gas out of one of the cylinder portions for initially driving the piston on its cyclical oscillation during start-up of the apparatus.

References Cited

UNITED STATES PATENTS 3,425,807   2/1969   Levy.

RONALD L. WIBERT, Primary Examiner

V. P. McGRAW, Assistant Examiner

U.S. Cl. X.R.

23—254; 250—47